No. 880,907. PATENTED MAR. 3, 1908.
F. F. NICKEL.
SLIDE RULE.
APPLICATION FILED DEC. 28, 1906.

4 SHEETS—SHEET 1.

WITNESSES:
A. Faber du Faur
Sally O. Yudsky

INVENTOR
Franz F. Nickel
BY
Fredk. A. Schuetz
ATTORNEY

No. 880,907.
PATENTED MAR. 3, 1908.
F. F. NICKEL.
SLIDE RULE.
APPLICATION FILED DEC. 28, 1906.
4 SHEETS—SHEET 2.
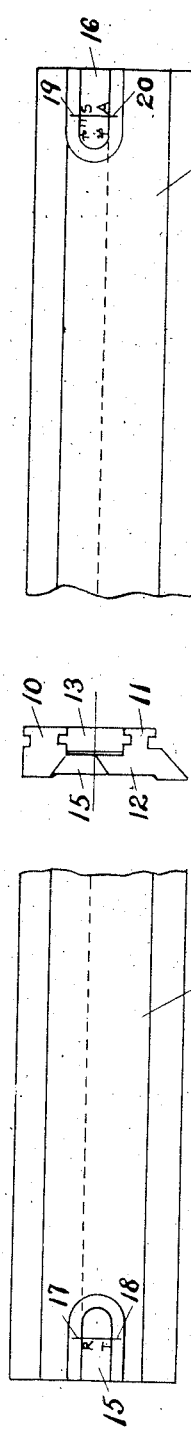
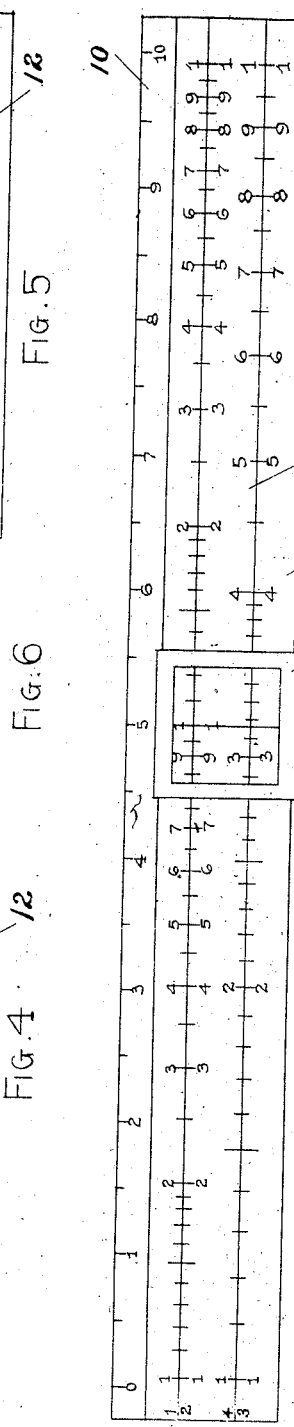
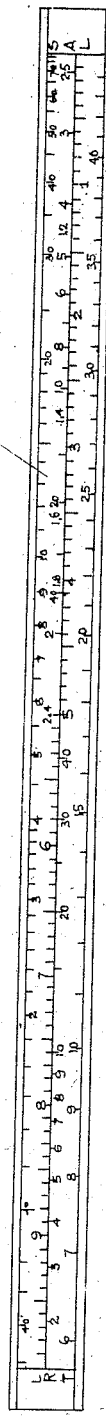
WITNESSES:
INVENTOR No. 880,907.  
F. F. NICKEL.  
SLIDE RULE.  
APPLICATION FILED DEC. 28, 1906.
PATENTED MAR. 3, 1908.
4 SHEETS—SHEET
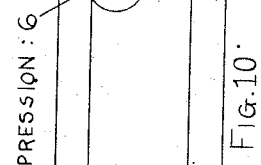
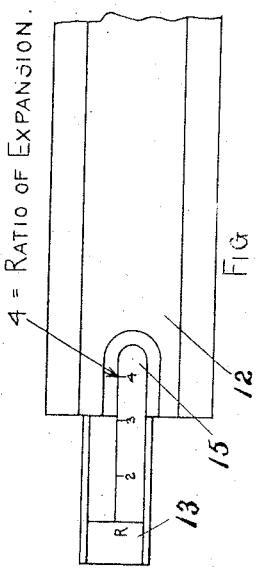
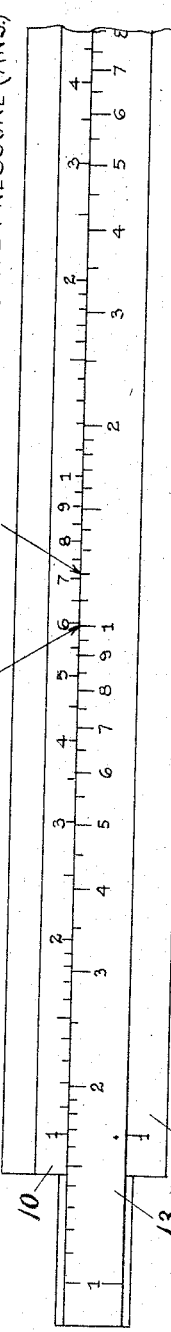
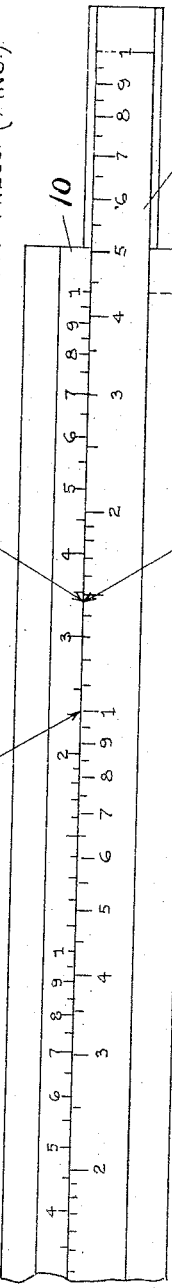
WITNESSES:
INVENTOR
BY
ATTORNEY No. 880,907.

F. F. NICKEL.
SLIDE RULE.
APPLICATION FILED DEC. 28, 1906.

PATENTED MAR. 3, 1908.

4 SHEETS—SHEET 4.

WITNESSES:

INVENTOR
BY
ATTORNEY

UNITED STATES PATENT OFFICE.

FRANZ F. NICKEL, OF EAST ORANGE, NEW JERSEY.

SLIDE-RULE.

No. 880,907.

Specification of Letters Patent.

Patented March 3, 1908.

Application filed December 28, 1906. Serial No. 349,861.

*To all whom it may concern:*

Be it known that I, FRANZ F. NICKEL, a citizen of the United States, and a resident of East Orange, in the county of Essex and State of New Jersey, have invented a certain new and useful Improvement in Slide-Rules, of which the following is a specification.

My invention relates to the so-called slide rules, and it has for its object a rule of this character by means of which certain problems which with the ordinary form of slide rule would require several settings of the slide, may be solved with but a single setting. I refer particularly to such problems as the determination of the mean effective pressure in a steam cylinder when the initial pressure and the ratio of expansion are given; or the determination of the mean effective pressure in an air compressor when the initial pressure and the ratio of compression are given.

Further, my invention comprehends a rule of this character, which will not in any way decrease the scope and application of the present forms of slide rules, but gives additional usefulness thereto.

For this purpose my invention consists in the novel arrangement of certain additional scales of graduations to be used in conjunction with the present form of slide rules, or with specially constructed slide rules.

The nature of my invention will best be understood in connection with the accompanying drawings in which—

Figure 1:
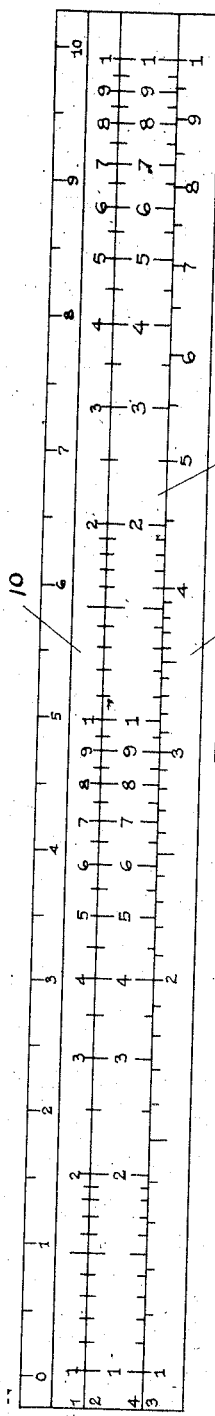
Figure 2:
Figure 3:
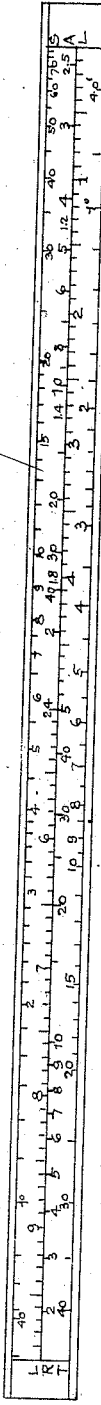

Figure 1 is a plan view of a runnerless form of slide rule. Fig. 2 is a view of the reverse side of the slide graduated according to my invention. Fig. 3 is a similar view of the reverse side of the slide graduated according to my invention and provided also with the usual scales. Figs. 4 and 5 are views of the reverse side of the rule. Fig. 6 is an end view of the rule. Fig. 7 is a plan view of another form of slide rule and provided with a runner. Fig. 8 is a view of the reverse side of the slide used in conjunction with the rule shown in Fig. 7 and provided with the additional graduations. Figs. 9 to 14 are views illustrating the operation of my improved rule.

As shown in the drawings, the main piece of my improved slide rule consists of two fixed parallel bars 10 and 11 connected by a cross-piece 12 the under face of which is adapted for a table of constants or formulas. The bars 10 and 11 are provided at their inner edges with longitudinal grooves in which is guided a slide 13 having longitudinal tongues fitting the said grooves. 14 represents an ordinary runner provided with a piece of glass or other transparent material, having a distinct line marked across the under side of its face. Notches 15 and 16 are provided respectively at the left and right hand ends of the main piece upon the under side and are provided with the guide marks 17, 18, and 19, 20 respectively The fixed bar 10 is provided with two logarithmic scales marked 1, the one progressing from the left hand end to the median point of the graduated length of the rule, and the other from the said median point to the right hand end. The fixed bar 11 is provided with a single logarithmic scale marked 3 progressing from the left hand end to the right hand end of the bar.

At the upper edge of the slide 13 are two logarithmic scales marked 2 in juxtaposition to the scales 1, the one progressing from the left hand end to the said median point, and the other from the median point to the right hand end of said slide. At the lower edge are two logarithmic scales marked 4 similar to those at the upper edge, on the scale 2 as shown in Fig. 1 progressing from the left hand end to the median point, and from the median point to the right hand end of the slide in juxtaposition to the scale 2; or a single logarithmic scale progressing from the left hand end to the right hand end in juxtaposition to the scale 3 as shown in Fig. 7.

The reverse side of the slide is usually provided with three scales S, T and L, the first at the upper edge being a logarithmic scale progressing from left to right and used in finding the sines of angles and the second at the lower edge progressing from left to right as in Fig. 8, or from right to left as in Fig. 3 and used in finding the tangents of angles. The third scale is generally provided in the center of the slide and is divided into equal parts progressing from right to left and used in finding the logarithms of numbers. These scales are read in conjunction with the marks 19, 18, and 20 respectively in the notches 15 and 16. To determine the logarithm of a number the left hand index of scale 4 is set over the number on scale 3 and the logarithm is read over the mark 20 in the right hand notch 16. It will be noted that in determining the logarithms of numbers from 1 to 3.16 less than one-half of the slide projects at the right hand end; whereas, in determining the logarithm of numbers from 3.16 to 10 more than one-half of the slide projects at the right hand of the rule.

Figure 13:
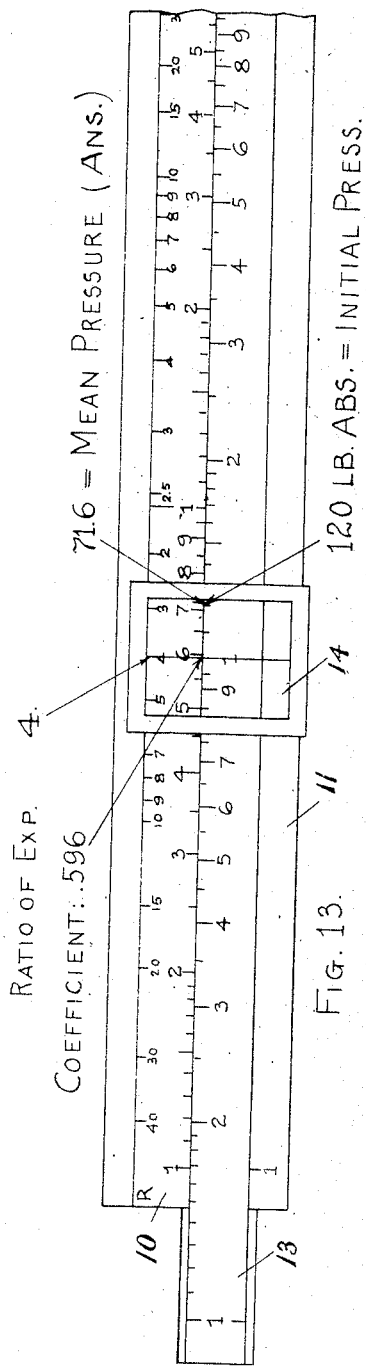
Figure 14:
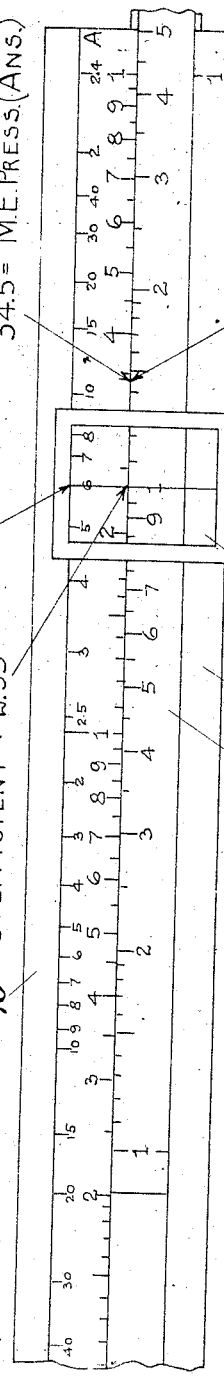

In addition to the scales above described which comprise those of the usual forms of slide rules, my invention consists in providing the additional logarithmic scale R (used to determine the mean pressure in a steam cylinder) either on the upper edge of the bar 10 as shown in Figs. 13 and 14 and for which the runner 14 is required; or preferably on the reverse side of the slide 13 as shown in Figs. 2, 3, 8 and 9, and preferably below the longitudinal center line of the slide, the said scale in either case occupying not more than one-half of the graduated length of the rule. This scale progresses in the former case from the median point toward the left hand end, and in the latter from the left hand end toward the median point.

My invention provides further for a second additional logarithmic scale A (used to determine the mean effective pressure in the air compressor) either on the upper edge of the bar 10 as shown in Figs. 13 and 14; or preferably on the reverse side of the slide 13 as shown in Figs. 2, 3, 8 and 10 and preferably above the longitudinal center line, the said scale in either case occupying not more than one-half the graduated length of the rule. This scale progresses in the former case from the median point toward the right hand end, and in the latter from the right hand end toward the median point. The scale R begins with 1 which coincides with the line 10 of the scale of logarithms in the form of rule shown in Figs. 1, 7, 11 and 12 and progresses toward the right up to 40, thus representing ratios of expansion from 1 to 40; or as in the form shown in Figs. 13 and 14, the division 1 is in the same vertical line with the median point and progresses toward the left, the transfer to the other scales being made with the runner 14. In the same manner the scale A is arranged to represent the ratios of compression from 2.4 to 40, the progression being as previously explained. Additional figures are also provided to cover ratios of compression lower than 2.4.

Reverting now to the first mentioned problem, viz: to find the mean effective steam pressure when the initial pressure and the ratio of expansion are given, it is necessary to divide this problem into three steps or operations. As deduction cannot be performed on the slide rule, the back pressure must first be separated, which leaves the mean pressure to be calculated. This mean pressure can be resolved into two factors—the initial pressure, and a coefficient representing the mean pressure per pound of initial pressure.

In connection with the second mentioned problem, viz: to find the mean effective pressure when the initial pressure and the ratio of compression are given, the back pressure need not be separated (it being the initial pressure) and therefore can be included in the coefficient. The product of coefficient and initial pressure will therefore give the mean effective pressure directly. The scales R and A are logarithmic scales representing these coefficients for various ratios of expansion and compression as explained, and are arranged to occupy not more than one-half of the graduated length of the rule. Therefore for any setting, not more than one-half of the slide projects beyond the rule. The coefficient may therefore be located on the scale opposite the median point of slide when the slide 13 is properly set and without further setting can be multiplied by any number (representing the initial pressure). If therefore the slide 13 be set so that the ratio of expansion on scale R coincides with the mark 17, as in Fig. 9; or as in Fig. 13, so that the median point of the slide is in the same vertical line with the given ratio of expansion, the coefficient may be read on scale 1. Then, over the initial pressure found on scale 2, the mean pressure in the case of expansion, or the mean effective pressure in the case of compression, may be read without further setting on scale 1. This is illustrated in Figs. 9 to 14, Figs. 9 to 12 illustrating the application with the additional scales R and A on the reverse side of the slide 13; and Figs. 13 and 14 the application with the additional scales on the upper edge of the bar 10. In the first case a ratio of expansion of 4 is assumed and the number 4 of scale R on the reverse side of the slide 13 is set to coincide with the mark 17 on the notch 15, see Fig. 9. The median point of the slide 13 will then be found to be under the point 0.597 of scale 1 and the rule is thereby set for any multiplication, so that it is only necessary to read off the answer of 71.6 on scale 1 for an initial pressure of say 120 lbs. absolute over the point 120 on scale 2. In the same manner for an assumed ratio of compression of 6, the number 6 of scale A on the reverse side of the slide 13 is set to coincide with the mark 20 of notch 16 and the answer 34.5 determined by multiplying the coefficient 2.35 by the assumed initial pressure 14.7 lbs. absolute.

In the form of slide rule illustrated in Figs. 13 and 14 the operation is substantially similar, reference being had to Figs. 13 and 14. The exception is that the coefficient is determined on scale 1 by setting the median point of the slide 13 in the same vertical line as the given number of expansions or compressions represented by the scales R or A on the upper edge of bar 10, the line of the runner 14 being used to make this adjustment or transfer.

This gives the coefficient on scale 1 over the median point of scale 2, and the multiplication by initial pressure is performed as above.

While I have shown the additional scales as graduated for use in the determinations of the mean pressure or the mean effective pressure, it is evident that these scales may be graduated to represent terms of other similar formulas.

I claim:—

1. In a slide rule, consisting of a main piece having an upper and a lower fixed bar and a movable slide between said bars: two logarithmic scales upon the upper bar, the one progressing from the left hand end to the median point of the graduated length of the rule and the other from said median point to the right hand end; a single logarithmic scale upon the lower bar, progressing from the left hand end to the right hand end; two logarithmic scales upon the slide at its upper edge, the one progressing from the left hand end to the median point and the other from said median point to the right hand end; two logarithmic scales upon the silde at its lower edge, the one progressing from the left hand end to the median point and the other from said median point to the right hand end; a logarithmic scale upon the reverse side of the slide at its upper edge, progressing from the left hand end to the right hand end; a logarithmic scale upon the reverse side of the slide at its lower edge, progressing from the right hand end to the left hand end; a scale upon the reverse side of the slide between said scales on the reverse side, progressing from right to left; and one or more additional logarithmic scales each occupying not more than one-half of the graduated length of the rule.

2. In a slide rule, consisting of a main piece having an upper and a lower fixed bar and a movable slide between said bars: two logarithmic scales upon the upper bar, the one progressing from the left hand end to the median point of the graduated length of the rule and the other from said median point to the right hand end; a single logarithmic scale upon the lower bar, progressing from the left hand end to the right hand end; two logarithmic scales upon the slide at its upper edge, the one progressing from the left hand end to the median point and the other from said median point to the right hand end; two logarithmic scales upon the slide at its lower edge, the one progressing from the left hand end to the median point and the other from said median point to the right hand end; a logarithmic scale upon the reverse side of the slide at its upper edge, progressing from the left hand end to the right hand end, a logarithmic scale upon the reverse side of the slide at its lower edge, progressing from the right hand end to the left hand end; a scale upon the reverse side of the slide between said scales on the reverse side, progressing from right to left; and an additional logarithmic scale on the reverse side of the slide of said rule progressing from the left hand end of said slide to the median point of the graduated length of said rule.

3. In a slide rule, consisting of a main piece having an upper and a lower fixed bar and a movable slide between said bars: two logarithmic scales upon the upper bar, the one progressing from the left hand end to the median point of the graduated length of the rule and the other from said median point to the right hand end; a single logarithmic scale upon the lower bar, progressing from the left hand end to the right hand end; two logarithmic scales upon the slide at its upper edge, the one progressing from the left hand end to the median point and the other from said median point to the right hand end; two logarithmic scales upon the slide at its lower edge, the one progressing from the left hand end to the median point and the other from said median point to the right hand end; a logarithmic scale upon the reverse side of the slide at its upper edge, progressing from the left hand end to the right hand end; a logarithmic scale upon the reverse side of the slide at its lower edge, progressing from the right hand end to the left hand end; a scale upon the reverse side of the slide between said scales on the reverse side, progressing from right to left; an additional logarithmic scale on the reverse side of the slide of said rule progressing from the left hand end of said slide to the median point of the graduated length of said rule; and a second additional logarithmic scale likewise on the reverse side of said slide but progressing from the right hand end of said slide to the said median point.

4. In a slide rule, consisting of a main piece having an upper and a lower fixed bar and a movable slide between said bars: two logarithmic scales upon the upper bar, the one progressing from the left hand end to the median point of the graduated length of the rule and the other from said median point to the right hand end; a single logarithmic scale upon the lower bar, progressing from the left hand end to the right hand end; two logarithmic scales upon the slide at its upper edge, the one progressing from the left hand end to the median point and the other from said median point to the right hand end; two logarithmic scales upon the slide at its lower edge, the one progressing from the left hand end to the median point and the other from said median point to the right hand end; a logarithmic scale upon the reverse side of the slide at its upper edge, progressing from the left hand end to the right hand end; a logarithmic scale upon the reverse side of the slide at its lower edge, progressing from the right hand end to the left hand end; a scale upon the reverse side of the slide of said rule progressing directly below the longitudinal center line of said slide from the right hand end of the slide to the median point of the graduated length of the rule, and directly above the said longitudinal center line from the said median point to the left hand end of said slide; an additional logarithmic scale on the reverse side of the slide of said rule progressing directly below the longitudinal center line of said slide from the left hand end of the slide to the median point of the graduated length of the rule, and a second additional logarithmic scale on the reverse side of the said slide progressing directly above the said longitudinal center line from the right hand end of said slide to the said median point.

Signed at New York in the county of New York and State of New York this 26th day of December A. D. 1906.

FRANZ F. NICKEL.

Witnesses:
A. FABER DU FAUR,
FREDK. F. SCHULTZ.